(12) United States Patent
Morgan et al.

(10) Patent No.: US 8,793,413 B2
(45) Date of Patent: Jul. 29, 2014

(54) ADAPTABLE STORAGE CARTRIDGE SYSTEM

(75) Inventors: Michael G Morgan, Los Altos Hills, CA (US); Bill Dublin, San Jose, CA (US); Max Tsai, Taiperi (TW); Homer Pitner, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 259 days.

(21) Appl. No.: 12/942,068

(22) Filed: Nov. 9, 2010

(65) Prior Publication Data

US 2012/0117289 A1    May 10, 2012

(51) Int. Cl.
*G06F 13/12*  (2006.01)
*G06F 13/38*  (2006.01)

(52) U.S. Cl.
CPC .................. *G06F 13/385* (2013.01)
USPC .............. 710/62; 361/679.31; 361/679.32; 361/679.33; 361/679.37

(58) Field of Classification Search
CPC ....... G06F 1/187; G06F 1/181; G11B 23/285; H05K 7/1427
USPC ........... 710/304, 60, 62; 361/679.33, 679.36, 361/679.37, 679.34; 439/352, 358
See application file for complete search history.

(56) References Cited

U.S. PATENT DOCUMENTS

| | | | | |
|---|---|---|---|---|
| 3,982,809 A | * | 9/1976 | Ward et al. | 439/354 |
| 5,654,873 A | * | 8/1997 | Smithson et al. | 361/679.37 |
| 5,995,365 A | * | 11/1999 | Broder et al. | 361/679.31 |
| 6,094,342 A | * | 7/2000 | Dague et al. | 361/679.33 |
| 6,166,901 A | * | 12/2000 | Gamble et al. | 361/679.34 |
| 6,249,432 B1 | * | 6/2001 | Gamble et al. | 361/679.35 |
| 6,290,541 B1 | * | 9/2001 | Furusho et al. | 439/607.22 |
| 6,606,242 B2 | * | 8/2003 | Goodman et al. | 361/679.36 |
| 6,661,677 B1 | * | 12/2003 | Rumney | 361/818 |
| 6,839,228 B2 | * | 1/2005 | Choi | 361/679.33 |
| 6,876,547 B2 | * | 4/2005 | McAlister | 361/679.33 |
| 6,947,254 B2 | | 9/2005 | Edwards et al. | |
| 6,963,358 B2 | | 11/2005 | Cohen et al. | |
| 6,987,927 B1 | * | 1/2006 | Battaglia et al. | 386/231 |
| 6,993,618 B2 | | 1/2006 | Chen et al. | |
| 7,054,153 B2 | * | 5/2006 | Lewis et al. | 361/679.33 |
| 7,180,733 B2 | * | 2/2007 | Chang | 361/679.33 |
| D565,568 S | | 4/2008 | Trifilio et al. | |
| 7,386,868 B2 | | 6/2008 | McCormack | |
| 7,393,247 B1 | * | 7/2008 | Yu et al. | 439/638 |

(Continued)

FOREIGN PATENT DOCUMENTS

EP        1607832        12/2005
JP        2011146085     7/2011

OTHER PUBLICATIONS

Serial ATA International Organization. Serial ATA. Revision 2.5. Oct. 27, 2005.*

(Continued)

*Primary Examiner* — Matthew D Spittle
(74) *Attorney, Agent, or Firm* — Mikel Boeve

(57) ABSTRACT

A data storage system and method comprises a storage device located inside a cartridge housing and an adapter module removable from the storage device. A first interface directly connects the storage device to the adapter module through an opening in the cartridge housing and a second interface different than the first interface connects the adapter module to a host device.

15 Claims, 7 Drawing Sheets

(56) References Cited

U.S. PATENT DOCUMENTS

| | | | |
|---|---|---|---|
| 7,407,330 B2* | 8/2008 | Smith et al. | 385/53 |
| 7,480,136 B2* | 1/2009 | Lalouette | 361/679.34 |
| 7,551,433 B2* | 6/2009 | Hammer et al. | 361/679.33 |
| 7,558,899 B2* | 7/2009 | Yip | 710/300 |
| 7,639,492 B2* | 12/2009 | Thomas et al. | 361/679.37 |
| 7,697,278 B2* | 4/2010 | Peng et al. | 361/679.35 |
| 7,702,830 B2* | 4/2010 | Brunet et al. | 710/62 |
| 7,791,874 B2 | 9/2010 | Reents et al. | |
| 7,818,160 B2* | 10/2010 | Collins et al. | 703/24 |
| 7,843,663 B2 | 11/2010 | Nave et al. | |
| 7,885,037 B2 | 2/2011 | Konshak et al. | |
| 7,903,401 B2* | 3/2011 | Lee et al. | 361/679.33 |
| 7,907,366 B2 | 3/2011 | Ulrich | |
| 7,934,938 B2* | 5/2011 | Bandhu et al. | 439/352 |
| 7,940,491 B2 | 5/2011 | Szeremeta et al. | |
| RE42,443 E | 6/2011 | Ban et al. | |
| D641,362 S | 7/2011 | Dublin | |
| 8,060,893 B2* | 11/2011 | Georgis | 720/600 |
| 8,072,848 B2 | 12/2011 | Lin | |
| 8,083,536 B2* | 12/2011 | Leach | 439/358 |
| 8,085,501 B2* | 12/2011 | Martin | 360/133 |
| 8,111,509 B2* | 2/2012 | Lee | 361/679.33 |
| 8,248,778 B2* | 8/2012 | Dai | 361/679.37 |
| 8,331,084 B2* | 12/2012 | Chung et al. | 361/679.34 |
| 2003/0096517 A1* | 5/2003 | Ho | 439/79 |
| 2003/0211784 A1 | 11/2003 | Wu et al. | |
| 2004/0162926 A1* | 8/2004 | Levy | 710/74 |
| 2005/0193159 A1* | 9/2005 | Ng et al. | 710/302 |
| 2007/0083356 A1* | 4/2007 | Brunet et al. | 703/23 |
| 2007/0197100 A1* | 8/2007 | Tsao | 439/638 |
| 2009/0293075 A1 | 11/2009 | Allsup et al. | |
| 2011/0287656 A1 | 11/2011 | Morgan et al. | |
| 2012/0233369 A1* | 9/2012 | Kung | 710/304 |

OTHER PUBLICATIONS

Addonics Technologies. Swapping Hard Drives is a "Snap" With New Addonics Snap-In SATA Mobile Rack. Oct. 10, 2006.*
Addonics Technologies. Snap-In SATA Mobile Rack. Data Sheet. Viewed Apr. 21, 2013.*
Vantec Thermal Technologies. SATA/IDE to USB 2.0 Adapter. Manual. 2007.*
Verbatim. Verbatim PowerBay Single USB and eSATA External Hard Drive. Version 1.00. User Manual. 2010.*
Addonics Technologies. Catalog. 2008.*
IBM. IBM RDX removeable cartridge USB hard drives deliver daily backup capability for System x servers and BladeCenter S. Jan. 13, 2009.*
Sonnet Technologies, Inc., Tempo Bridge, Oct. 16, 2010, http://www.sonnettech.com/product/tempo_bridge.html; http://web.archive.org/web/20101016013457/http://www.sonnettech.com/product/tempo_bridge.html (last accessed Apr. 30, 2012).
Imation Odyssey Mobile USB Adapter Author CDW Date: Dec. 2, 2011 http://www.cdw.com/shop/products/Imation-Odyssey-Mobile-USB-Adapter/1394919.aspx.
Sata Wire—USB 2.0 Interface to Any 2.5 Sata Drive Author: Apricorn Date: Jul. 26, 2011 http://www.apricorn.com/products/notebook-hard-drive-upgrade-kits/sata-wire.html#pr.
Blacx Docking Station Author: Thermaltake Date Feb. 15, 2012 htp://www.thermaltakeusa.com/Product.aspx?C=13465&ID=1642.
Sata-IO Introduces Specification for Consumer Electronic Industry to Incorporate Portable Consumer Storage Author: Sata-IO Date: Jan. 4, 2010.

* cited by examiner

ADAPTABLE STORAGE CARTRIDGE SYSTEM

BRIEF SUMMARY

The present disclosure relates to a system including a storage device located inside a cartridge housing and an adapter module removable from the storage device. A first interface directly connects the storage device to the adapter module through an opening in the cartridge housing and a second interface different than the first interface connects the adapter module to a host device.

In one particular embodiment, an apparatus comprises a cartridge including a first component and second removable component, the first cartridge component comprises a storage device and the second removable cartridge component comprises an interface adapter circuit, a first interface, and a second differing interface wherein the first interface is configured to directly connect to the storage device through the first storage cartridge component and the second interface is configured to connect to a host device.

In another particular embodiment, a method of connecting an external storage device to a host comprises providing a directly accessible first interface to the external storage device. Then connecting an adapter circuit directly to the external storage device through the first interface, and connecting the adapter circuit to the host through a second interface different than the first interface.

BRIEF DESCRIPTION OF THE DRAWINGS

The disclosure may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to a digital storage system that utilizes removable and adaptable interfaces to allow maximum customization for an end user. External storage devices have typically included a device like a hard drive encased inside a housing made of a material like plastic that can be known as a cartridge. Also inside this housing or cartridge is circuitry that connects to the interface of the hard drive on one side and provides an addition interface that is accessible from outside the cartridge or housing. In some instances, this circuitry is a printed circuit board (PCB) that has a standard serial interface such as a Serial Advanced Technology Attachment (SATA) interface to connect to the hard drive and another standard serial interface such as a Universal Serial Bus (USB) interface to be accessible outside the cartridge by a host device, such as a Personal Computer (PC).

Certain problems arise with this system when a user wishes to change aspects of the interface circuitry. Since the interface circuitry is contain within the cartridge or housing, it can not be easily changed or swapped out by the end user. Other problems related to flexibility of where and how to connect the storage device to a host arise due to the interface circuitry being contained in the cartridge itself.

Figure 1:
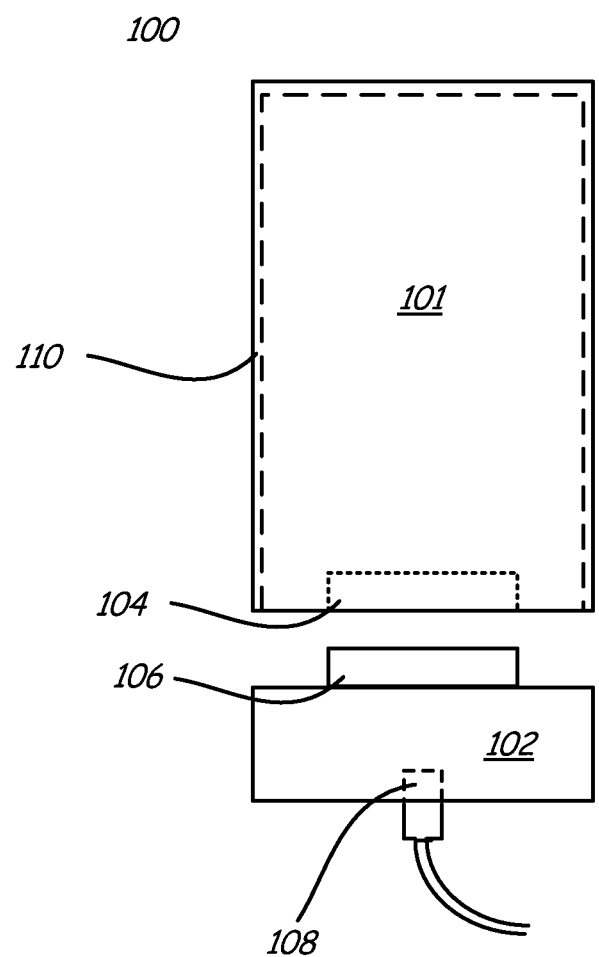
FIG. 1 is a storage device cartridge with a removable adapter module.

FIG. 1 is a storage system 100 that includes a cartridge 110 with a removable adapter module 102. The adapter module 102 includes a first interface 106 and a second interface 108. In some embodiments first interface 106 is different that second interface 108. In FIG. 1, first interface 106 is depicted as a male interface and second interface 108 is depicted as a female interface, although any logical combination of male/female interfaces is possible.

In certain embodiments, first interface 106 is a standard serial interface such as a SATA interface, while second interface 108 is a different standard serial interface such as a USB interface. Second interface 108 could alternatively be a USB 2.0, USB 3.0, eSATA, Firewire (such as Firewire 800), or a wireless network interface. Some of these interfaces are subject to standards setting organizations and the scope of such standard-defined interfaces are meant to include all current, past and future specifications that are compatible with the storage system disclosed. The use of terms defined by a standard in this disclosure is for the sole purpose of conveniently describing the functional elements represented by that standard.

Storage device 101 can be a hard disk drive (for example 2½ inch, 3½ inch, and other form factors), a solid state drive, or any other storage device capable of electronically storing data. In some embodiments, storage device 101 is encased by a cartridge housing 110 that can be made of plastic, metal, or any appropriate material. Storage device 101 includes a directly accessible or connectable storage device interface 104. The cartridge housing 110 is arranged so that an opening exists in the cartridge housing to allow direct access to storage device interface 104. In some embodiments, storage device interface 104 is a female SATA interface, including in some instances, a 15-pin power plug combined with a 7-pin data plug. The system is arranged so that adapter module 102 can connect directly to storage device 101 through first interface 106 and storage device interface 104 with no intervening circuitry. In some embodiments, adapter module 102 is encased in a cartridge housing such that together storage device 101 and adapter module 102 make up a storage cartridge when connected together.

Adapter module 102 can be removed from storage device 101 without the use of any buttons or levers to facilitate that removal. Adapter module 102 can be swapped out by an end user for multiple purposes, such as to upgrade to a different second interface 108, or to minimize the size of the storage device when mobility is important. In some embodiments second interface 108 is removable from adapter module 102 and alternatively it is not removable from adapter module 102.

Figure 2:
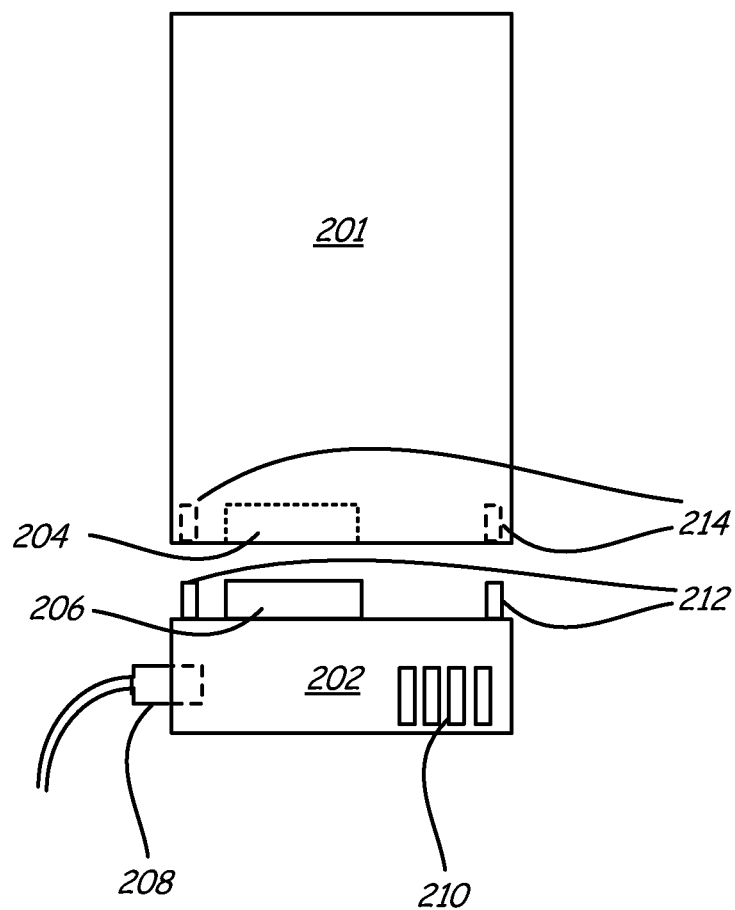
FIG. 2 is an alternative embodiment of a storage device cartridge with alignment features and/or an indication system on the adapter module.

FIG. 2 is an alternative embodiment of a storage device cartridge 201 with alignment features 212, 214 on adapter module 202. FIG. 2 also depicts an indication system 210 on the adapter module 202. The first interface 206 and storage device interface 204 are shown to be offset from center in this embodiment, although they could be in any relative aligning position on storage device cartridge 201 and adapter module 202. Adapter module 202 also is shown with second interface 208 on a side rather than the bottom. This setup can allow adapter module 202 to function as a dock in some embodiments. Although both alignment features 212, 214 and indication system 210 are shown together in FIG. 2, these elements are not dependent on each other and systems could include only one or the other or both of alignment features 212, 214 or indication system 210.

Male alignment features 212 are attached to adapter module 202 and aid with structural support and to ensure that the interfaces are properly connected together. Alignment receptors 214 are located in storage cartridge 201 to facilitate the support and alignment. In some embodiments, alignment features 212, 214 are made of plastic, metal, or the same material as the cartridge. FIG. 2 is shown with two male alignment features 212, but there could also be one, three, four or any effective number of male alignment features 212 (including a reciprocal number of alignment receptors 214).

Indication system 210 can be implemented as a series of light emitting diodes (LEDs) in some embodiments. Indication system 210 can function to communicate relevant information to the end user, such a remaining storage capacity of storage device cartridge 201, wireless signal strength, or remaining battery power, among other useful information. Indication system 210 is shown as 4 LED components in FIG. 2, but any number of useful components could be utilized, including one, two, three, five, or six.

Figure 3:
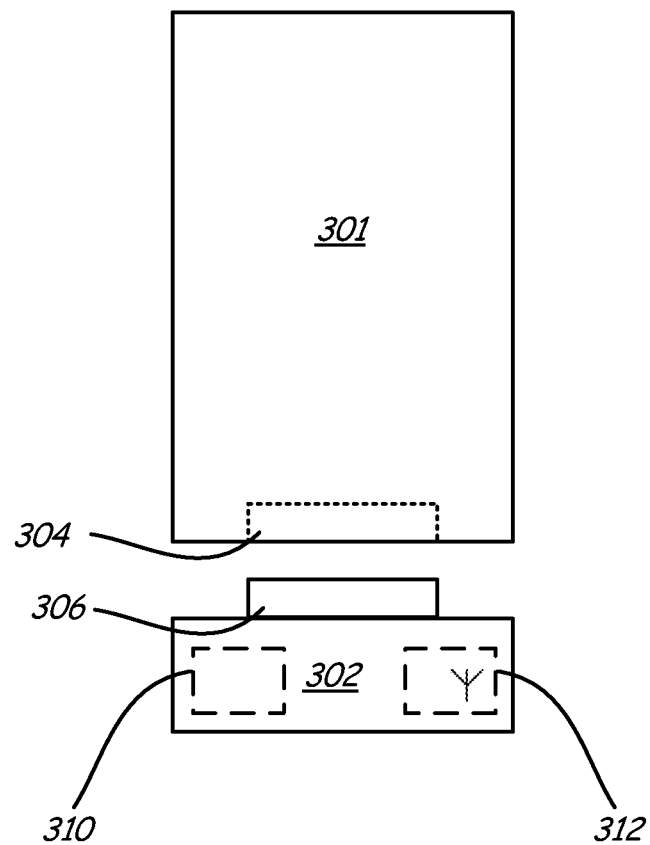
FIG. 3 is an alternative embodiment of a storage device cartridge with a removable adapter module containing memory for applications and/or a wireless interface.

FIG. 3 is an alternative embodiment of a storage device cartridge 301 with a removable adapter module 302 containing memory 310 for applications and/or a wireless interface 312. First interface 306 is still directly connected to storage device interface 304 in this embodiment, but the second interface on adapter module 302 is now wireless interface 312. Although both application memory 310 and wireless interface 312 are shown together in FIG. 3, these elements are not dependent on each other and systems could include only one or the other or both of application memory 310 and wireless interface 312.

In some embodiments, memory 310 is a solid state memory such as flash, ST-RAM, MRAM, RRAM or any other applicable memory type. In certain systems, whenever adapter module 302 is inserted into storage device cartridge 301, an application stored in memory 310 is automatically executed or prompts a user to allow the execution of the application. Some examples of application software that can reside on memory 310 include back-up software, aggregation software, encryption/security software, media playing software, media sharing software, digital rights management software, device drivers, network protocol software, or any other useful application.

Wireless interface 312 is designed to communicate with a host device without the burdens of a physical cable connection. In some embodiments wireless interface 312 is a Wi-Fi 802.11a/b/g/n or other similar protocol. In other embodiments wireless interface 312 could be a Bluetooth connection.

Figure 4:
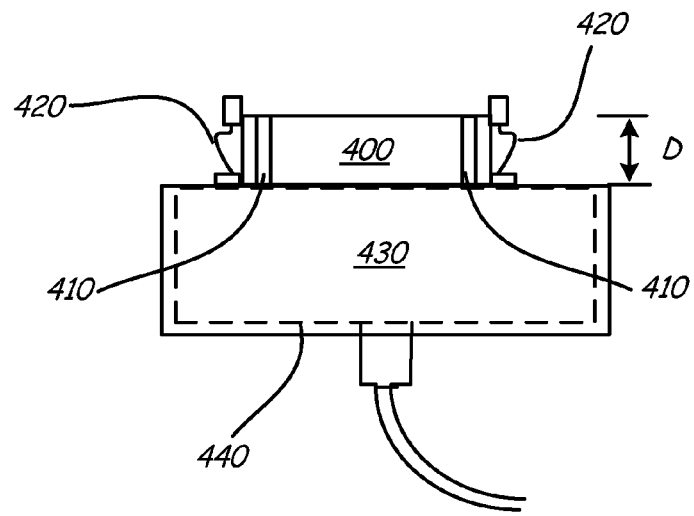
FIG. 4 depicts an adapter module and enhanced interface connector according to some embodiments.

FIG. 4 depicts an adapter module 430 and enhanced interface connector 400 according to some embodiments. Three different enhancements are shown to connector 400, but any combination of one, two, three or four enhancements are contemplated. Connector 400 includes an extended length D of at least 10 mm, and in some embodiments of at least 9 mm. This extended length allows for better strength and reliability of the interface connection with the storage device cartridge. In alternative embodiments, the length D is extended to even greater than 10 mm, including 11 mm, 12 mm or more depending on the application.

Guiding rails 410 are also presented on the connector 400 to enhance mechanical connection. These guiding rails 410 are raised tube-like or half-tube-like extensions of the connector 400 material. Alternatively, they could be made of a different material than connector 400. FIG. 4 shows two guiding rails 410 on the front side of connector 400, one on each lateral side. In some embodiments there are also a similar set of guiding rails 410 on the back side of connector 400 (back side not shown). Any number of guiding rails 410 can be included on connector 400, including one, two, three, four, five, or six.

In some embodiments, spring clips 420 are located on the lateral edges of connector 400 to provide spring force against a side wall of the receiving end in the storage device cartridge. Springs clips 420 can be made out of metal and fashioned to represent any number of spring force constants depending on the application by altering their geometry.

In other embodiments, connector 400 includes an electrostatic shielding component such as a metal sheeting on one or both sides of connector 400.

FIG. 4 also shows adapter interface circuitry 440 in outline form inside the housing of adapter module 430. In some embodiments, interface circuitry 440 is a printed circuit board (PCB) with each of the two interface hardware components located on opposing sides of the PCB.

Figure 5A:
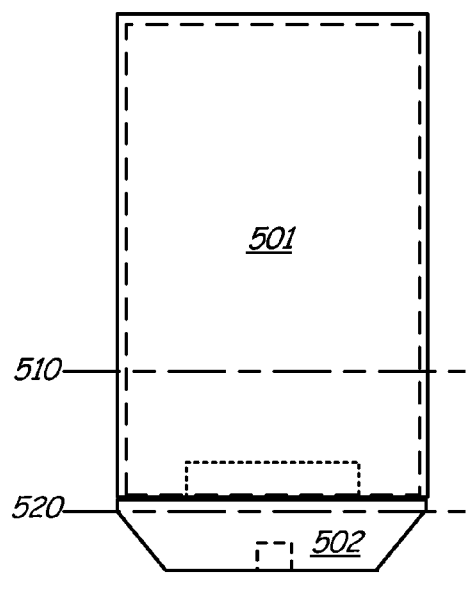
FIG. 5A is a front view of a storage cartridge including the directly connected adapter module, according to some embodiments.
Figure 5B:
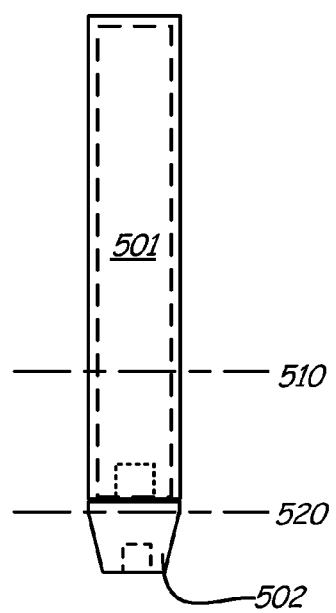
FIG. 5B is a side view of the storage cartridge in FIG. 5A.

FIGS. 5A and 5B show front and side views of a storage cartridge including storage device 501 directly connected to adapter module 502, according to some embodiments. Cross-section lines 510, 520 are illustrated to shown that through those lines, storage device 501 and adapter module 502 have substantially equal cross-section areas. This design feature helps to maximize the mobility of the storage system by keeping the two components streamlined and not overly bulky. Also, in this embodiment, adapter module 502 is shown with a tapered shape.

Figure 6:
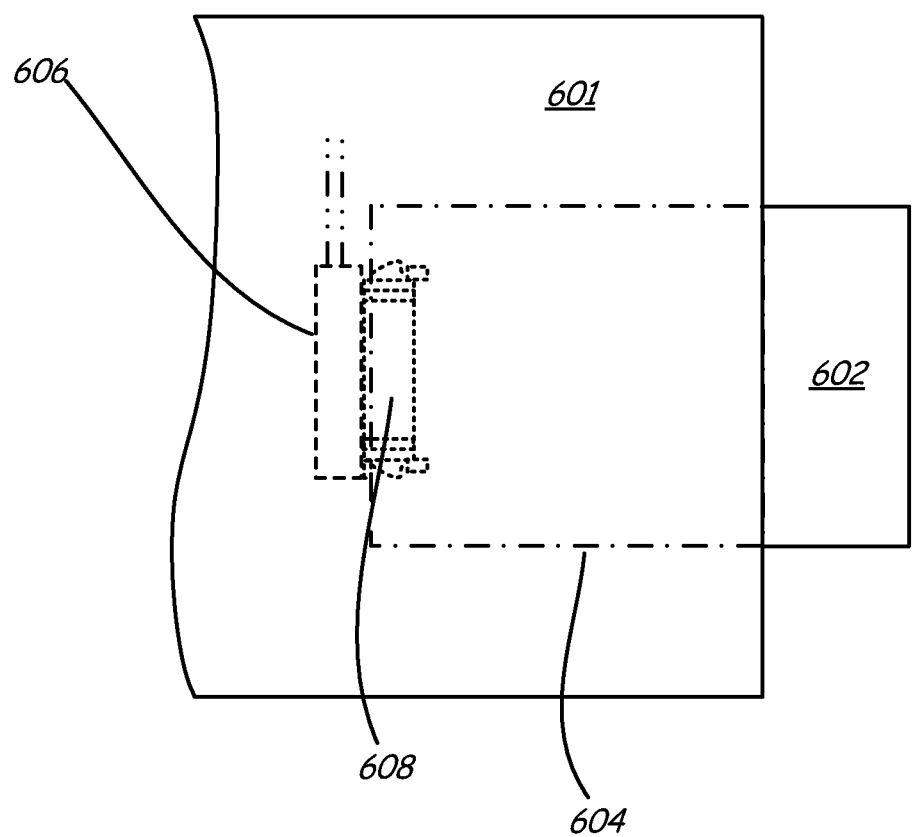
FIG. 6 is an alternative embodiment of a storage device cartridge inserted into a receiving slot of a host.

FIG. 6 is an alternative embodiment of a storage device cartridge 602 inserted into a receiving slot 604 of a host 601. The dashed lines represent portions of the system that are internal to host 601 when storage device cartridge 602 is inserted. Host 601 communicates with storage device cartridge 602 through host internal interface 606 and directly connected to storage device interface 608 (some embodiments utilizing the features of FIG. 4). Slot 604 is designed to conform to the shape of cartridge 602. Interface 606 can be any number of logical internal interfaces for host 601. In some embodiments, host 601 is a desktop computer, computer case, laptop, consumer electronics device, digital video recorder, television, set-top box, cable or satellite box, video camera, media player, or other device that could utilize storage device cartridge 602.

Figure 7:
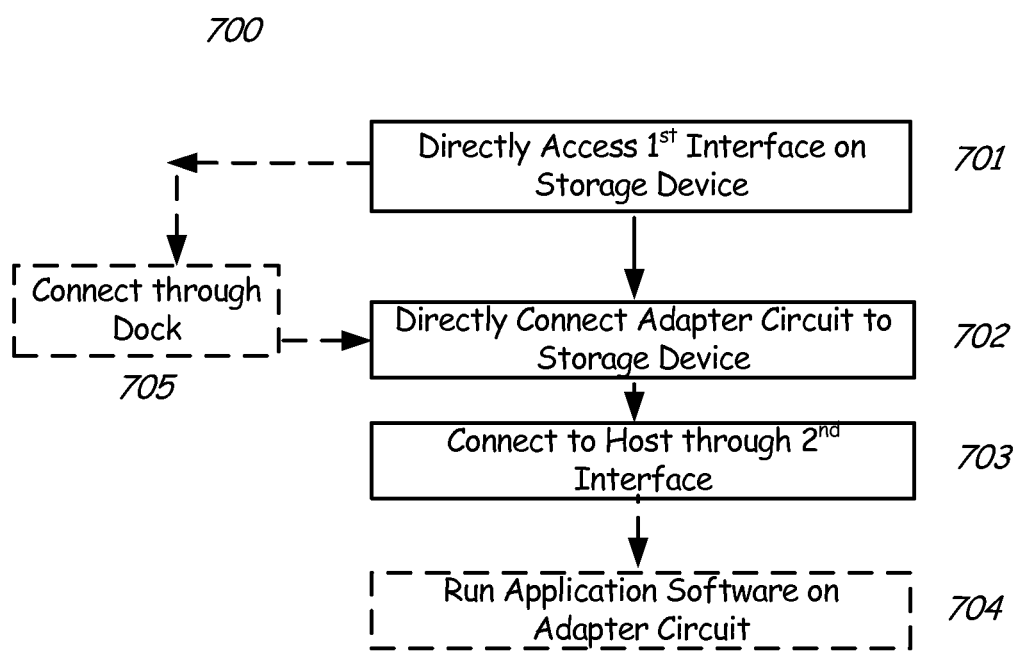
FIG. 7 shows a flow diagram of an exemplary method for connecting an external storage device cartridge to a host.

FIG. 7 shows a flow diagram of an exemplary method 700 for connecting an external storage device cartridge to a host. In the first step 701, a first interface on an adapter circuit is provided direct access to a storage device interface in a cartridge through an aperture. During second step 702, the adapter circuit is directly connected to the storage device. In some embodiments, first alternative step 705 is utilized to connect the storage device through a dock to a host device. Finally, in the third step 703 the host device is connected to the adapter circuit through a second interface. In some embodiments, the second interface is different than the first interface. The host device gets access to the storage device through the adapter circuit.

In some embodiments, once the host device is connected in step 703, an additional step 704 is executed that runs an application software located on a memory of the adapter circuit. This is discussed in more detail above regarding FIG. 3. The method 700 can automatically run the application software in some instances when user acknowledgement or input is not needed or was previously given (such as routine back-up operations, or data aggregation). In other cases, the application software will prompt the user to install or take some other action with respect to its content.

Figure 8:
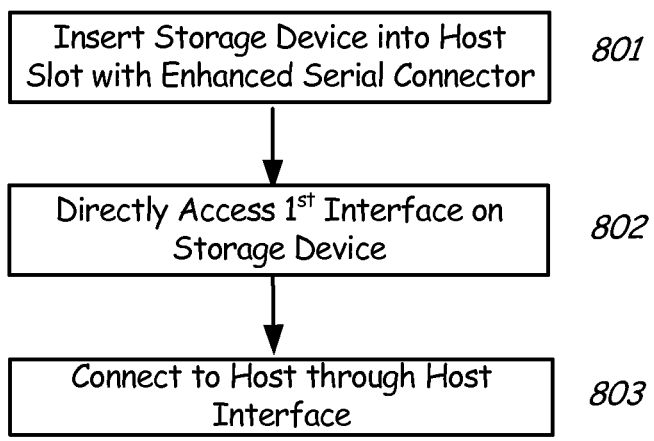
FIG. 8 shows an alternative flow diagram of a method for connecting an external storage device cartridge to a host.

FIG. 8 shows an alternative flow diagram of an exemplary method 800 for connecting an external storage device cartridge to a host through a slot. First step 801, consists of inserting a storage device such as a cartridge into a similarly shaped slot in a host system. The host system may include an enhanced serial connector such as the connector described in FIG. 4. In the second step 802, a first interface on a storage device is provided to allow direct access to the interface in a cartridge through an aperture. Finally, in the third step 703 the host device is connected to the storage device through a host interface. The host device gets access to the storage device through the host interface.

In this description, reference is made to the accompanying set of drawings that form a part hereof and in which are shown by way of illustration several specific embodiments. It is to be understood that other embodiments are contemplated and may be made without departing from the scope or spirit of the present invention. The detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Thus, embodiments of the ADAPTABLE STORAGE CARTRIDGE SYSTEM are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A system comprising:
   a storage device located inside a cartridge housing;
   an adapter module with a cross sectional area on a first interface side that is substantially the same as a widest cross sectional area of the cartridge housing, the adapter module removable from the storage device and the cartridge housing and directly connected to the storage device when the adapter module is engaged with the storage device;
   a first interface directly connecting the storage device to the adapter module through an opening in the cartridge housing; and
   a second interface different than the first interface connecting the adapter module to a host device.

2. The system of claim 1 wherein the first interface is a SATA interface.

3. The system of claim 2 wherein the second interface is selected from the group consisting of a USB interface, a wireless interface, a Firewire interface, a network interface, and an eSATA interface.

4. The system of claim 2 wherein the SATA interface comprises at least one spring clip on a shortest lateral side exterior surface of the SATA interface to abut a side wall on the storage device.

5. The system of claim 4 wherein the SATA interface comprises an extended SATA plug extending at least 10 mm, two spring clips on opposing shortest lateral sides of the extended SATA plug, a metal shielding plate on the extended SATA plug, and at least one guiding rail on the top or bottom longest external surface of the extended SATA plug separate from the spring clips on the extended SATA plug.

6. The system of claim 1 wherein the adapter module comprises a memory containing application software.

7. The system of claim 6 wherein the application software comprises storage backup software or encryption software.

8. The system of claim 1 wherein the adapter module comprises a circuit board and molded plastic.

9. The system of claim 1 wherein the adapter module comprises alignment features.

10. The system of claim 1 wherein the storage device comprises a hard disk drive or a solid state drive.

11. A system comprising:
    a storage device encased inside a cartridge housing;
    an adapter assembly fixed in a slot located in a host device configured to accept the storage device and cartridge, the adapter assembly directly connected to the storage device when the adapter assembly is engaged with the storage device;
    a first interface directly connecting the storage device to the adapter assembly through an opening in the cartridge housing; and
    a second interface different than the first interface connecting the adapter assembly to the host device.

12. An apparatus comprising:
    a cartridge including a first component and second removable component, the first cartridge component comprises a storage device and the second removable cartridge component has a cross sectional area on a first interface side that is substantially the same as a widest cross sectional area of the cartridge first component and comprises an interface adapter circuit, a first interface, and a second differing interface wherein the first interface is configured to directly connect to the storage device through the first storage cartridge component and the second interface is configured to connect to a host device.

13. The apparatus of claim 12 wherein the first interface comprises an extended serial plug, at least two spring clips on opposing exterior shortest lateral side surfaces of the extended serial plug to abut opposing side walls on the storage device, and at least two guiding rails on the extended serial plug.

14. The apparatus of claim 13 wherein the second removable cartridge component comprises a memory containing executable storage backup software.

15. A method of connecting an external storage device to a host comprising:
   providing a directly accessible first interface to the external storage device encased inside a cartridge housing;
   connecting an adapter circuit located outside the cartridge housing directly to the external storage device utilizing a SATA plug extending at least 10 mm, two spring clips connected to the SATA plug on opposing shortest lateral side exterior surfaces, and four guiding rails located on the SATA plug, two guiding rails on the top longest side and two guiding rails on the bottom longest side wherein the adapter circuit is coupled to no more than one interface configured to connect with a storage device; and
   connecting the adapter circuit to the host through a second interface different than the first interface.

* * * * *